(12) United States Patent
Lerner et al.

(10) Patent No.: US 11,615,499 B2
(45) Date of Patent: Mar. 28, 2023

(54) MANAGING TRANSPORT OCCUPANTS DURING TRANSPORT EVENTS

(71) Applicant: TOYOTA MOTOR NORTH AMERICA, INC., Plano, TX (US)

(72) Inventors: Emily S. Lerner, McKinney, TX (US); Nutonya L. Parker, Dallas, TX (US); Randall M. Harris, Dallas, TX (US); Anil Nagpal, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 515 days.

(21) Appl. No.: 16/396,066

(22) Filed: Apr. 26, 2019

(65) Prior Publication Data

US 2020/0342562 A1 Oct. 29, 2020

(51) Int. Cl.
| | | |
|---|---|---|
| *G06Q 50/30* | (2012.01) | |
| *G06F 16/27* | (2019.01) | |
| *H04W 4/02* | (2018.01) | |
| *H04W 4/029* | (2018.01) | |
| *H04W 4/021* | (2018.01) | |

(Continued)

(52) U.S. Cl.
CPC ............ *G06Q 50/30* (2013.01); *G06F 16/27* (2019.01); *H04W 4/021* (2013.01); *H04W 4/023* (2013.01); *H04W 4/029* (2018.02); *H04L 67/12* (2013.01); *H04L 67/52* (2022.05)

(58) Field of Classification Search
CPC .......... G06Q 50/30; G06Q 10/063116; G06Q 10/02; H04L 67/10; H04L 67/16; H04L 67/18; H04L 51/02; H04L 51/32; H04L 67/12; H04L 63/083; H04L 67/52; G06F 16/17; G06F 16/27; H04W 4/023; H04W 4/029; H04W 4/021; B60W 50/12
See application file for complete search history.

(56) References Cited

U.S. PATENT DOCUMENTS

| | | |
|---|---|---|
| 5,623,260 A | 4/1997 | Jones |
| 6,116,639 A | 9/2000 | Breed et al. |

(Continued)

FOREIGN PATENT DOCUMENTS

EP 2915707 A1 9/2015

OTHER PUBLICATIONS

Faisal et al., "Autonomous car system using facial recognition and geo location services", 2016 6th International Conference—Cloud System and Big Data Engineering (Confluence), Jan. 14-15, 2016,Date Added to IEEE Xplore: Jul. 11, 2016, ISBN Information: INSPEC Accession No. 16154106.

(Continued)

*Primary Examiner* — Jungwon Chang

(57) ABSTRACT

An example operation may include one or more of receiving a request from a requesting device to initiate a transport to perform a transport event at a target location, identifying the transport to perform the transport event, identifying a target device associated with the transport event is located at the target location, receiving location updates of the transport and the target device at a server, determining the transport has initiated the transport event based on the location updates of the transport, determining the target device and the transport are proximate to one another based on the location updates, and monitoring the location updates to identify whether the transport has deviated from a target travel path area.

20 Claims, 17 Drawing Sheets

(51) Int. Cl.
    *H04L 67/12*      (2022.01)
    *H04L 67/52*      (2022.01)

(56)          References Cited

U.S. PATENT DOCUMENTS

| | | | |
|---|---|---|---|
| 6,166,627 | A | 12/2000 | Reeley |
| 7,840,427 | B2 | 11/2010 | O'sullivan |
| 9,507,346 | B1 | 11/2016 | Levinson et al. |
| 2014/0093133 | A1 | 4/2014 | Frank et al. |
| 2014/0306799 | A1 | 10/2014 | Ricci |
| 2016/0301698 | A1 | 10/2016 | Katara et al. |
| 2017/0127215 | A1* | 5/2017 | Khan ................ H04W 4/50 |
| 2018/0012151 | A1* | 1/2018 | Wang ............. G06Q 10/1093 |
| 2018/0101925 | A1* | 4/2018 | Brinig ............... G06K 7/1417 |
| 2018/0211228 | A1* | 7/2018 | Narayan ............ H04L 67/16 |
| 2018/0211348 | A1* | 7/2018 | Narayan ........... G06Q 10/109 |
| 2019/0204110 | A1* | 7/2019 | Dubielzyk .......... G01C 21/367 |
| 2019/0375409 | A1* | 12/2019 | Hunt .................. B60W 50/12 |
| 2020/0238953 | A1* | 7/2020 | Spasovski ........ G01C 21/3407 |

OTHER PUBLICATIONS

Ghoseiri et al., "Real-Time Rideshare Matching Problem", Final Report UMD-2009-05, DRTR07-G-0003, prepared for U.S. Department of Transportation, Jan. 2011.

Miller et al., "Vehicle Occupancy Detection System", May 5, 2017, https://repository.uwyo.edu/honors_theses_16-17/27/.

Kumar et al., "Vehicle Tracking and Anti-Theft System", i-Manager's Journal on Computer Science; Nagercoil vol. 5, Iss. 2, (Jun./Aug. 2017): 17-22. DOI: 10.26634/jcom.5.2.13906.

\* cited by examiner

600

MANAGING TRANSPORT OCCUPANTS DURING TRANSPORT EVENTS

TECHNICAL FIELD

This application generally relates to managing transports and occupants, and more particularly, to managing transport occupants during transport events.

BACKGROUND

Vehicles or transports, such as cars, motorcycles, trucks, planes, trains, scooters, etc., are being utilized by various occupants in a variety of ways. For example, a car or van can provide a taxi service, whether an automated transport or user operated transport. Users may operate their handheld computing devices to select a transport for a ride to a particular destination. Transports may be identified and controlled by computing devices, such as a computer that controls the vehicle itself and/or via a controller device, such as a smartphone or a computer managed by a vehicle operator.

Users of vehicles may be from all walks of life. The users may be young or old and may require constant supervision by others. Also, the vehicles may offer numerous features from hard-coded software which may govern an acceleration rate, speed, or suspension function to peripheral features, such as temperature controlled seats, and multimedia functions. As vehicles are being operated to provide transportation services, the managing parties may desire to have optimal control over the vehicle actions conducted during a vehicle event, such as a pick-up and/or drop-off event.

SUMMARY

One example embodiment may provide a method that includes one or more of one or more of receiving a request from a requesting device to initiate a transport to perform a transport event at a target location, identifying the transport to perform the transport event, identifying a target device associated with the transport event is located at the target location, receiving location updates of the transport and the target device at a server, determining the transport has initiated the transport event based on the location updates of the transport, determining the target device and the transport are proximate to one another based on the location updates, and monitoring the location updates to identify whether the transport has deviated from a target travel path area.

Another example embodiment may provide a system including a server configured to perform one or more of receive a request from a requesting device to initiate a transport to perform a transport event at a target location, identify the transport to perform the transport event, identify a target device associated with the transport event is located at the target location, receive location updates of the transport and the target device at a server, determine the transport has initiated the transport event based on the location updates of the transport, determine the target device and the transport are proximate to one another based on the location updates, and monitor the location updates to identify whether the transport has deviated from a target travel path area.

A further example embodiment may provide a non-transitory computer readable medium comprising instructions, that when read by a processor, cause the processor to perform one or more of receiving a request from a requesting device to initiate a transport to perform a transport event at a target location, identifying the transport to perform the transport event, identifying a target device associated with the transport event is located at the target location, receiving location updates of the transport and the target device at a server, determining the transport has initiated the transport event based on the location updates of the transport, determining the target device and the transport are proximate to one another based on the location updates, and monitoring the location updates to identify whether the transport has deviated from a target travel path area.

A yet further example embodiment may include a method comprising one or more of identifying a target device has entered a transport and has initiated a transport event at a target location, applying permissions, associated with the target device, to the transport event, determining a transport event modification has occurred, when the transport has stopped moving for a predetermined period of time and one or more transport operations have occurred, prior to arriving at a transport event destination, determining whether the permissions permit the transport event modification, and notifying one or more registered devices associated with the target device of the transport event modification.

A yet further example embodiment may include a system comprising a server configured to perform one or more of identify a target device has entered a transport and has initiated a transport event at a target location, apply permissions, associated with the target device, to the transport event, determine a transport event modification has occurred, when the transport has stopped movement for a predetermined period of time and one or more transport operations have occurred, prior to arrival at a transport event destination, determine whether the permissions permit the transport event modification, and notify one or more registered devices associated with the target device of the transport event modification.

A yet further example embodiment may include a non-transitory computer readable medium comprising instructions, that when read by a processor, cause the processor to perform one or more of identifying a target device has entered a transport and has initiated a transport event at a target location, applying permissions, associated with the target device, to the transport event, determining a transport event modification has occurred, when the transport has stopped moving for a predetermined period of time and one or more transport operations have occurred, prior to arriving at a transport event destination, determining whether the permissions permit the transport event modification, and notifying one or more registered devices associated with the target device of the transport event modification.

DETAILED DESCRIPTION

Figure 1A:
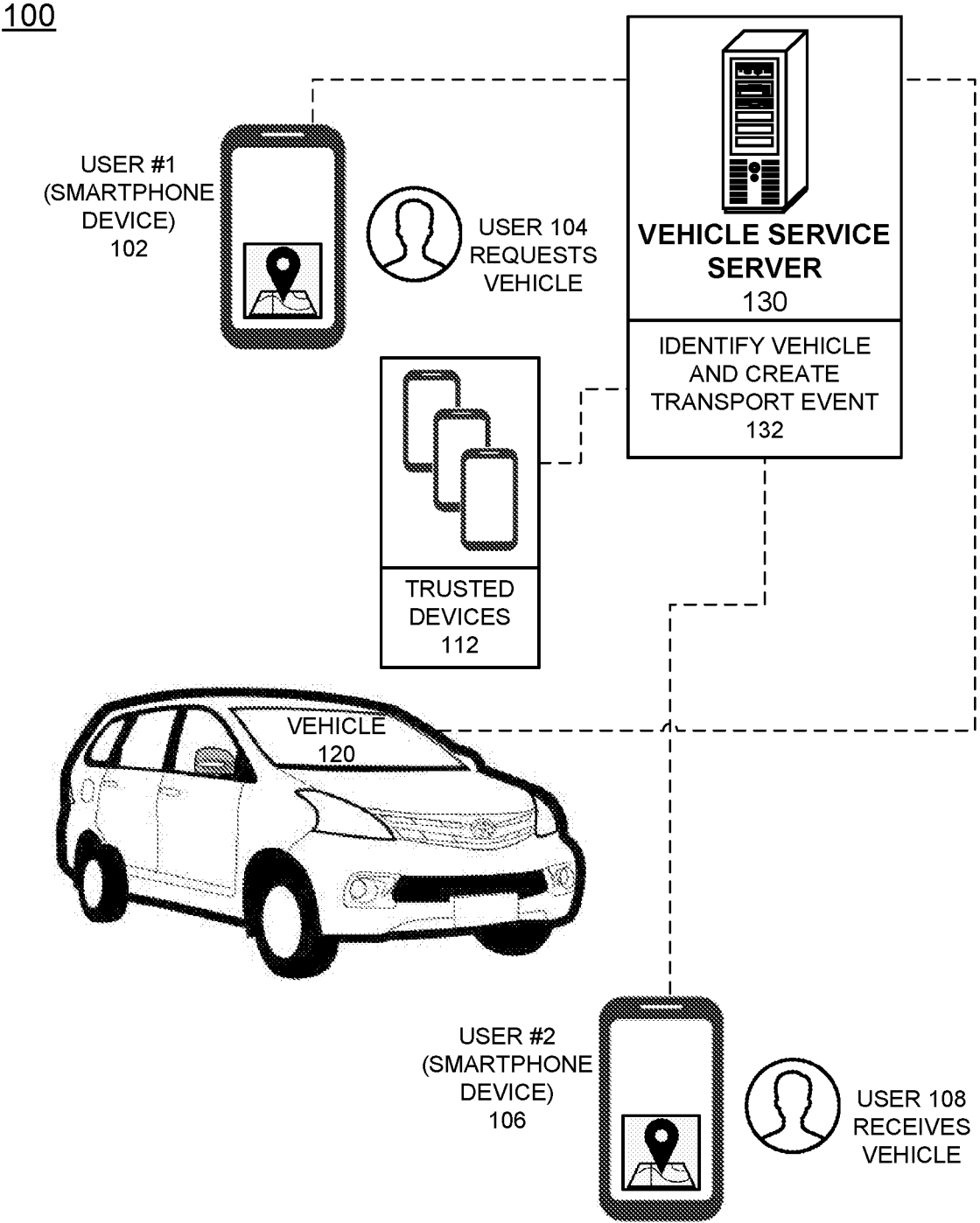
FIG. 1A illustrates a network diagram of a transport access request configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a verification system, and a vehicle data distribution system. The vehicle status data, received in the form of communication update messages, such as wireless data network communications and/or wired communication messages, may be received and processed to identify vehicle/transport status conditions and provide safety and optimal transport alerts to assist with vehicle travel. For example, a first user profile may be applied to a particular transport/vehicle to monitor and authorize the vehicle for another user at a remote location.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The example embodiments of the instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for applying a user profile status to the vehicle when a user requests access to a vehicle for the user or for another user, such as in the example of a parent or guardian requesting a vehicle to provide transportation services for another user, such as a subordinate party (e.g., child, elderly person, etc.). Also, sensor information may be identified to identify whether the vehicle is operating safely and whether the occupant user is safe based on basic safety tests during the vehicle access period. Information collected before, during and/or after a vehicle's operation may be collected and stored in a transaction on a shared ledger, which may be generated and committed to the immutable ledger as determined by a permission granting consortium, and thus in a "decentralized" manner, such as via a blockchain membership group. Each interested party (i.e., driver, remote driver, company, agency, occupant, etc.) may want to limit the exposure of private information, and therefore the blockchain and its immutability can limit the exposure and manage permissions for each particular user vehicle profile. A smart contract may be used to provide compensation, permission determination, quantify a user profile score, apply vehicle event permissions, identify a collision event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

The instant application includes vehicle event and/or corresponding computer controllers that are configured to share relevant data that is likely to assist other vehicles, detect/avoid dangerous conditions, and assist third parties with identifying those parties to certain vehicle events. Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a network diagram of a transport access request configuration, according to example embodiments. Referring to FIG. 1A, the network diagram 100 includes a user 104 accessing a user device 102 to request access to a vehicle 120 on behalf of another user 108 operating a target user device 106. The vehicle 120 may be a rented, owned, partially owned (i.e., subject to other owners), autonomously driven by a non-present driver, semi-autonomously driven by a driver or driven by a conventional manual vehicle operator. The vehicle may accept the user request sent from the user device 102 as managed by a vehicle service server 130, which receives the request, identifies an available vehicle and creates a new transport event 132. The server 130 may identify the user profile for the user 104 and may then apply the user profile to the vehicle 120 prior to a driving event. The vehicle 120 may have a set of features and services available to the occupants, however, the user profile of the requesting entity may require certain features be limited to only a sub-set of those features given a user status (e.g., parent requesting the vehicle for a child). Also, certain requirements may be required, such as child safety measures prior to the vehicle being selected for pick-up and drop-off of the subordinate user 108.

In operation, as the user's device 104 is identified as having sent a request to access the vehicle, the vehicle 120 may apply the user profile(s) of the requesting entity and/or the target entity 108 to the vehicle. The vehicle features required may be identified to provide child safety measures, security measures from third parties trying to access the vehicle while in route, etc. For example, a parent may request a vehicle pickup their child at a school so the child can be driven home. The location restrictions may permit the vehicle to drive to the school, identify the child via the child's description and/or via a smart device operated by the child (e.g., smart tag, smartphone, smartwatch, etc.), receive the child, and drive the child home. One example of a vehicle restriction may require the vehicle to not permit the doors to open until the vehicle is at the home location, not permit the vehicle to drive a route that is not the preferred route, not permit the vehicle to move past a particular distance from the child's home, etc. Other features may include restrictions to the speed and acceleration features, which may not permit the user to accelerate past a certain acceleration rate or speed in order to reduce the risk of a collision. In another example, if the passenger/occupant does not require such restrictions, the vehicle may be permitted to drive at faster speeds, greater distances, and/or provide media options to occupants not previously available to children passengers. The vehicle may have a customized profile sent from the vehicle server 130 listing the features which are permissible. The list may be downloaded to the vehicle and applied as a vehicle profile file that is customized based on the passenger restrictions/permissions. Vehicle sensors may monitor the vehicle actions to ensure the restrictions are followed appropriately.

Any of the vehicles may include sensors on any portion of the interior and/or exterior of a vehicle. The sensors may be hardwired to a central controller or other processor of the vehicle or may be in wireless communication with a central controller of the vehicle's computer via various wireless communication protocols. The data may be transmitted from the central controller, such as an on-board computer, a user's smartphone, a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc.

The types of sensors include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors.

Autonomous vehicles may be regulated where sensor data is mandated for various reasons since operation of the vehicle is controlled by a computer and not necessarily a person. As a result, the sharing of the sensor data gathered by autonomous vehicles may be required by various agencies and third parties to ensure safety measures. As noted previously, the vehicle 120 may be a vehicle operated by a human driver or an autonomous vehicle operated by a computer and/or remote agent designed for users to ride in during a transport event. The vehicle sensor data may be collected via a plurality of the vehicle sensors. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, etc.

Owners of autonomous/non-autonomous vehicles (or occupants of the vehicles) may register their personal profiles in a shared ledger or other data management system so the information collected during sensor collection efforts may be shared and the owner's profile and/or vehicle may be credited with a predetermined value also identified in the shared ledger, via a smart contract. The smart contract may identify the parties of the agreement, permissions for vehicle occupants, types of data, current profile statuses and other parameters. The immutability of the sensor data may also be preserved via the shared ledger format of a blockchain.

Referring again to FIG. 1A, when a user 102 accesses a vehicle service server 130 via their smartphone device 102, the user profile may be identified by the server 130, to identify the user, their profile and/or current/previous statuses (e.g., parent, guardian, young occupant, older occupant, etc.). The vehicle 120 is selected if it is available for use and can provide the safety measures or requirements necessary to pick-up the target user 108 at the target location. An event 132 is created and any trusted devices 112 (e.g., parents, teachers, babysitters, schools, etc.) may be notified accordingly of the event and any subsequent event alerts (e.g., deviations, collisions, completed trips, modifications to the vehicle event, etc.).

Figure 1B:
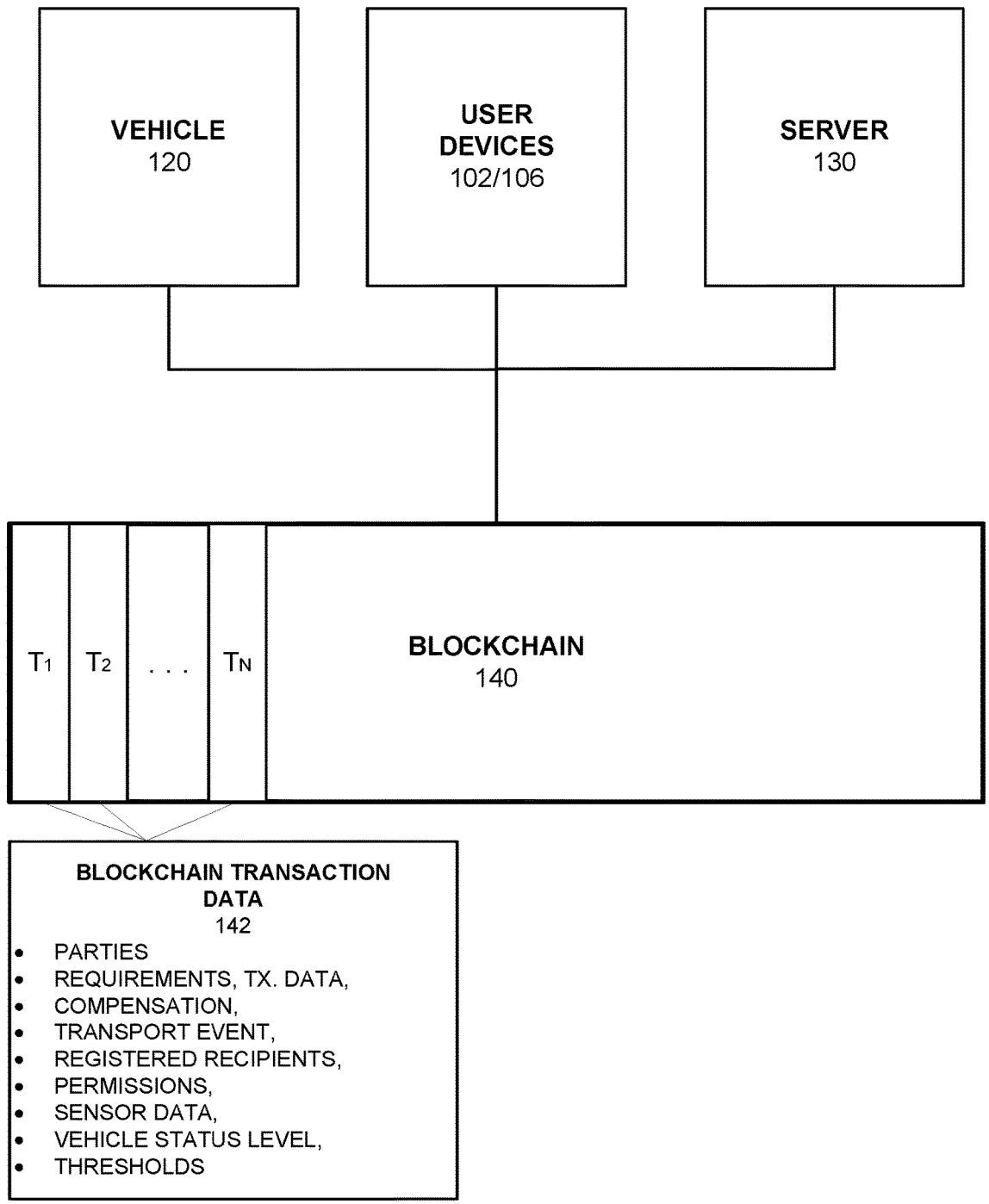
FIG. 1B illustrates a blockchain configuration for storing blockchain transaction data, according to example embodiments.

FIG. 1B illustrates a blockchain configuration for storing blockchain transaction data, according to example embodiments. Referring to FIG. 1B, the example configuration 150 provides for the vehicle 120, the user devices 102/106 and the server 130 sharing information with a distributed ledger (i.e., blockchain) 140. As the events occur, such as the vehicle request, vehicle identification, user profile retrieval, user profile/access status identification, rules and permissions being applied to the vehicle, vehicle event modification, vehicle operational behavior monitoring, etc., a smart contract is used to invoke rules, information gathering and terms for the vehicle events. The blockchain transaction data 142 is saved for each transaction, such as the access event, the subsequent updates to a vehicle status, event modifications, etc. The transactions may include the parties, the requirements (e.g., 18 years of age, legal guardian of occupant, valid driver's license, etc.), compensation levels, the distance traveled during the event, the registered recipients permitted to access the event, rights/permissions, sensor data retrieved during the event to log details of the event and modify a user's vehicle status, and thresholds used to make determinations about whether the event should be permitted, should be terminated, was completed, etc.

Figure 1C:
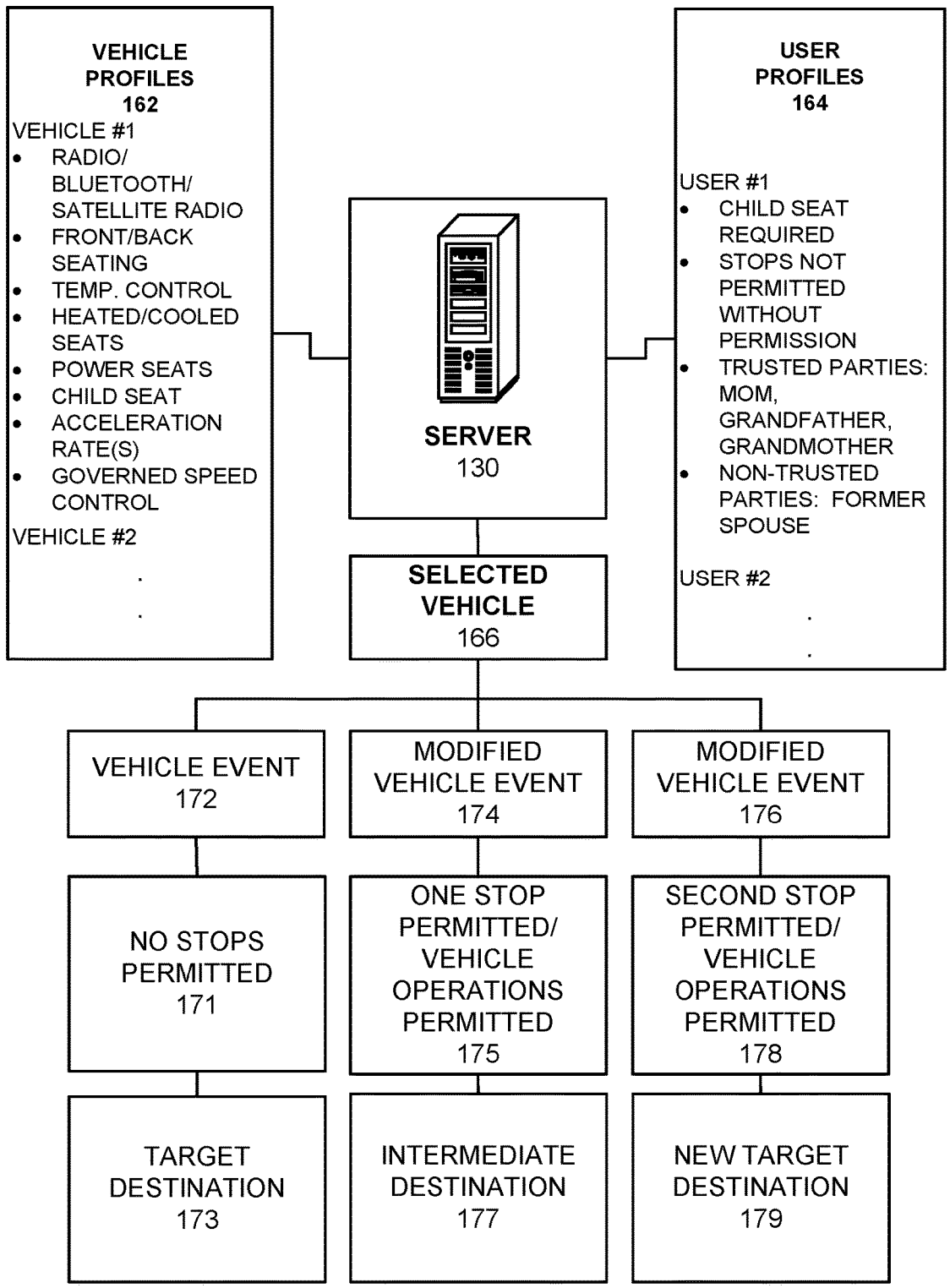
FIG. 1C illustrates a transport and user profile identification and selection procedure, according to example embodiments.

FIG. 1C illustrates a transport and user profile identification and selection procedure, according to example embodiments. Referring to FIG. 1C, the configuration 160 includes the server 130 being accessed to identify user profile information 164 and vehicle information 162. The vehicle profiles may store information, such as a vehicle's features, such as peripheral features, entertainment features, safety features, etc., which may or may not be permitted to be used while operating the vehicle based on the settings of the user profile(s) 164. For example, in a particular scenario, a selected vehicle 166 may be paired with one or more vehicle events 172. The initial vehicle event 172 may be setup by a parent user for a child user. The permissions, restrictions and other information pertaining to the vehicle event may be 172 may be setup as a trip with no stops permitted 171, no opening or closing of the doors and one known target destination 173, such as the child/parent home location. All the rules and restrictions may be setup as an event file that is created by the server 130 based on the rules and permissions in the user profiles 164 and which is then applied to the vehicle 166. The vehicle door statuses may be identified by the vehicle and controlled by the vehicle controller device to remain closed until the vehicle enters the area near the target destination.

In one specific example, the child or parent may attempt to modify the event 174 to include an additional stop 177 or a new destination, such as due to a change in plans, etc. This new modified stop may be identified 175 as a single stop that is added to the destinations or as a new destination. For example, the rules may identify the stop as a grocery store pick-up event, where the trunk is permitted to be opened but not the vehicle doors so the groceries can be picked-up in the vehicle by a grocery curb-side service and placed in the trunk, however, the child may be safe inside since the doors will not open at this intermediate event 174. Another example of a modified event 176 may include the child requesting to go to a friend's house to pickup a friend on the way home for a visit. The second stop 178 may be authorized as a new target destination 179 by the parent or other trusted devices 112, such as the mom, dad, grandparent, the friend's mom, dad, etc. The modified vehicle event 176 may require a confirmation by one or more of the trusted party's devices prior to being accepted and identified by the current vehicle event 172. If the confirmation does not come in a specific period of time, the event request may be cancelled.

FIG. 1C illustrates a transport and user profile identification and selection procedure, according to example embodiments.

Figure 1D:
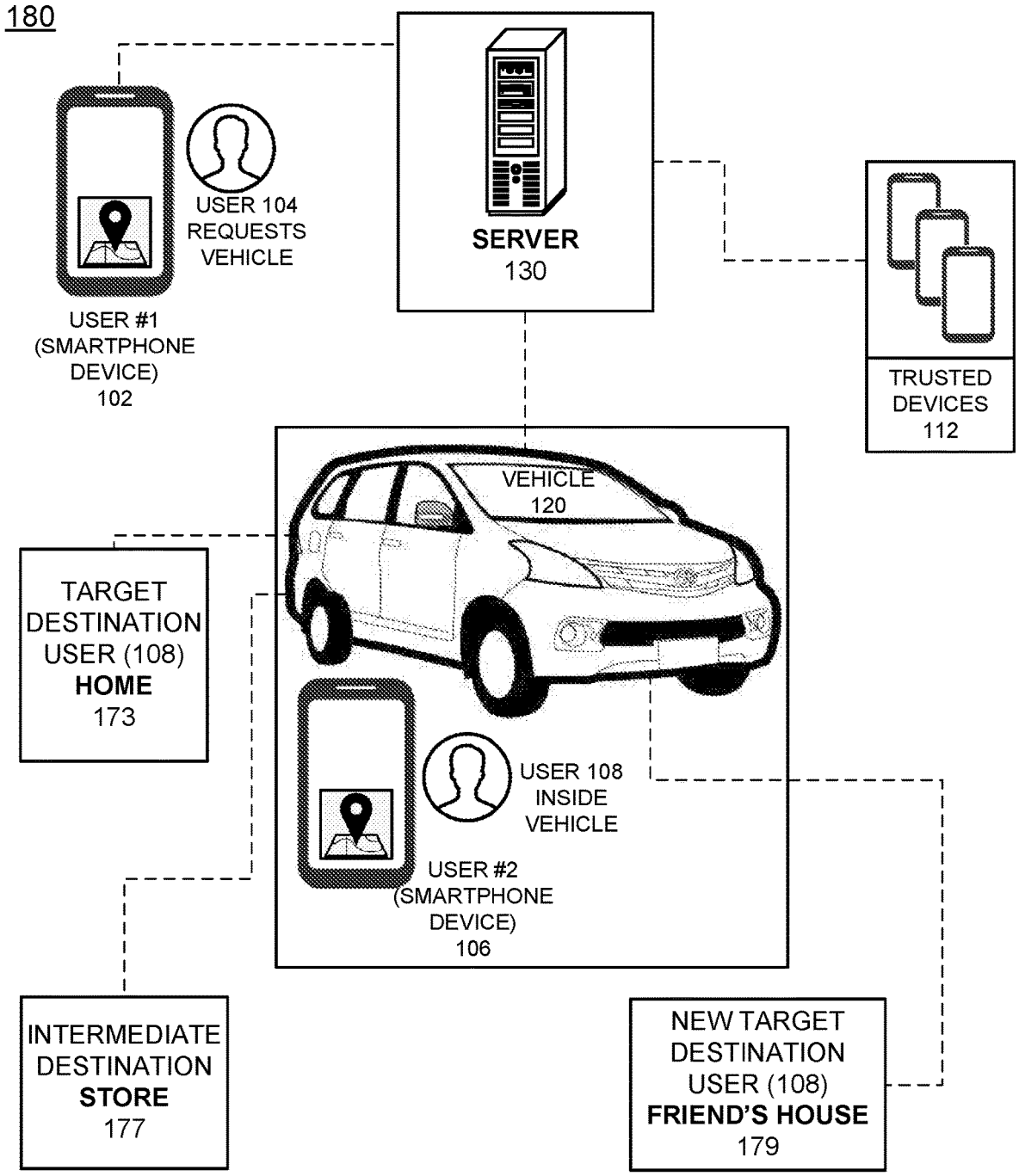
FIG. 1D illustrates a network diagram of a transport event modification configuration, according to example embodiments.

FIG. 1D illustrates a network diagram of a transport event modification configuration, according to example embodiments. Referring to FIG. 1D, the example 180 continues with the example of FIG. 1C, where a child user 108 is being driven to a home destination 173. However, the parent may submit a request to have the vehicle pick-up the groceries at the local store's curbside service 177. The vehicle 120 may travel to the store, not permit the doors to open, monitor the child's device to ensure the child has not attempted to leave the vehicle by tracking the location information of both the vehicle and the child's device 106. In the event that the child has attempted to travel to a friend's house to stay at that location instead and/or pick-up a friend and bring the friend home, the new target destination/intermediate destination 179 may be added to the vehicle's event route assuming approval for such a request is approved by a registered and trusted device 112.

Figure 2A:
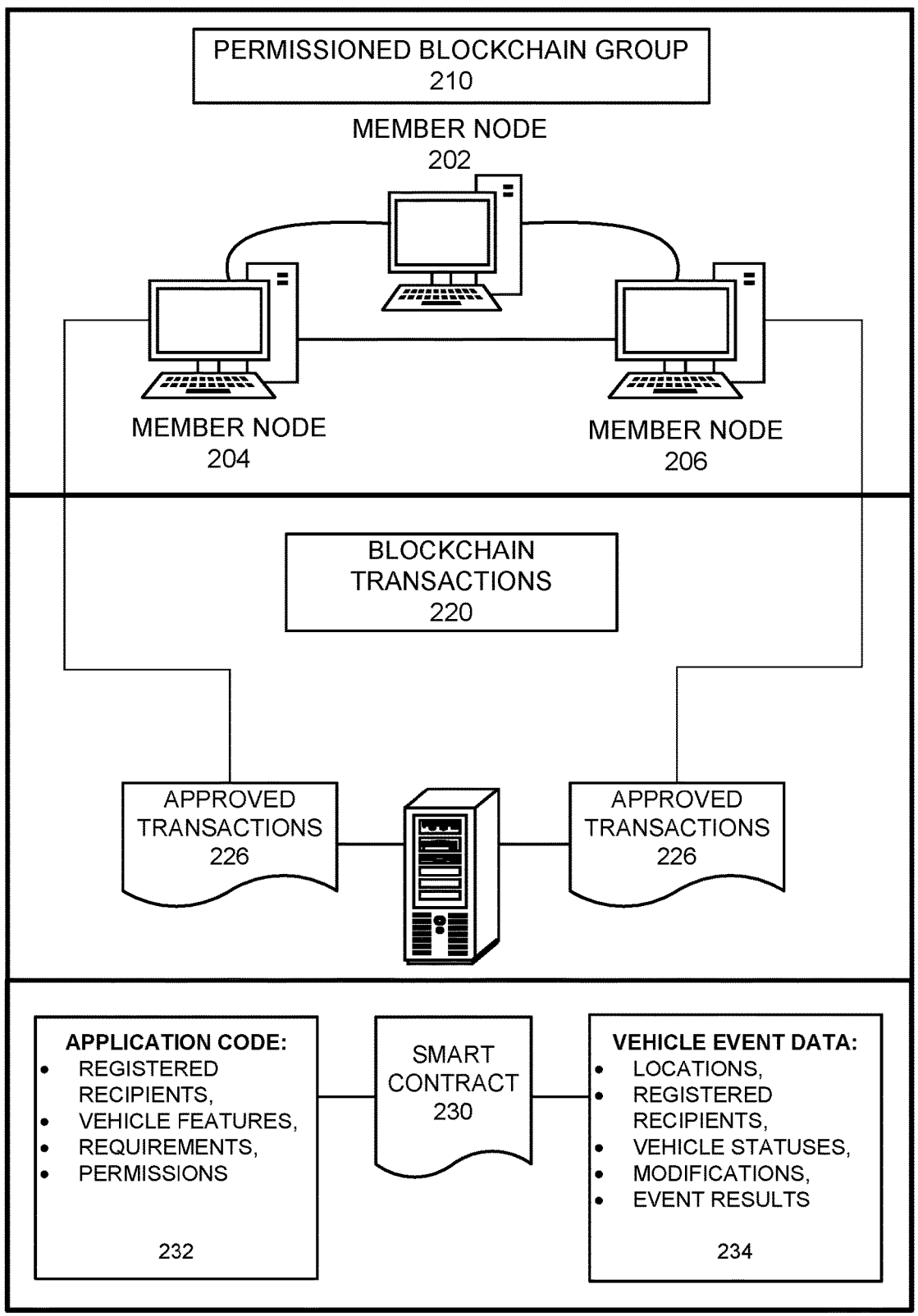
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a permissioned blockchain group 210. The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure. In other embodiments, the blockchain group 210 may be a permissionless blockchain group.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify whether requesting entities are registered to receive vehicle access, what features they are entitled/required to receive given their profile statuses and whether to monitor their actions in subsequent events. For example, when an event occurs and a user is riding in the vehicle, the sensor data monitoring may be triggered, and a certain parameter, such as a vehicle velocity, may be identified as being above/below a particular threshold for a particular period of time, then the result may be a change to a current status which requires an alert to be sent to the managing party (i.e., parent, server, etc.) so the deviation can be corrected and noted. The vehicle sensor data collected may be based on types of sensor data used to collect information about vehicle's driving. The sensor data may also be the basis for the vehicle event data 234, such as a location(s) to be traveled, an average speed, a top speed, acceleration rates, whether there were any collisions, was the expected route taken, whether safety measures in place, etc. All such information may be the basis of smart contract terms 230, which are then stored in a blockchain.

Figure 2B:
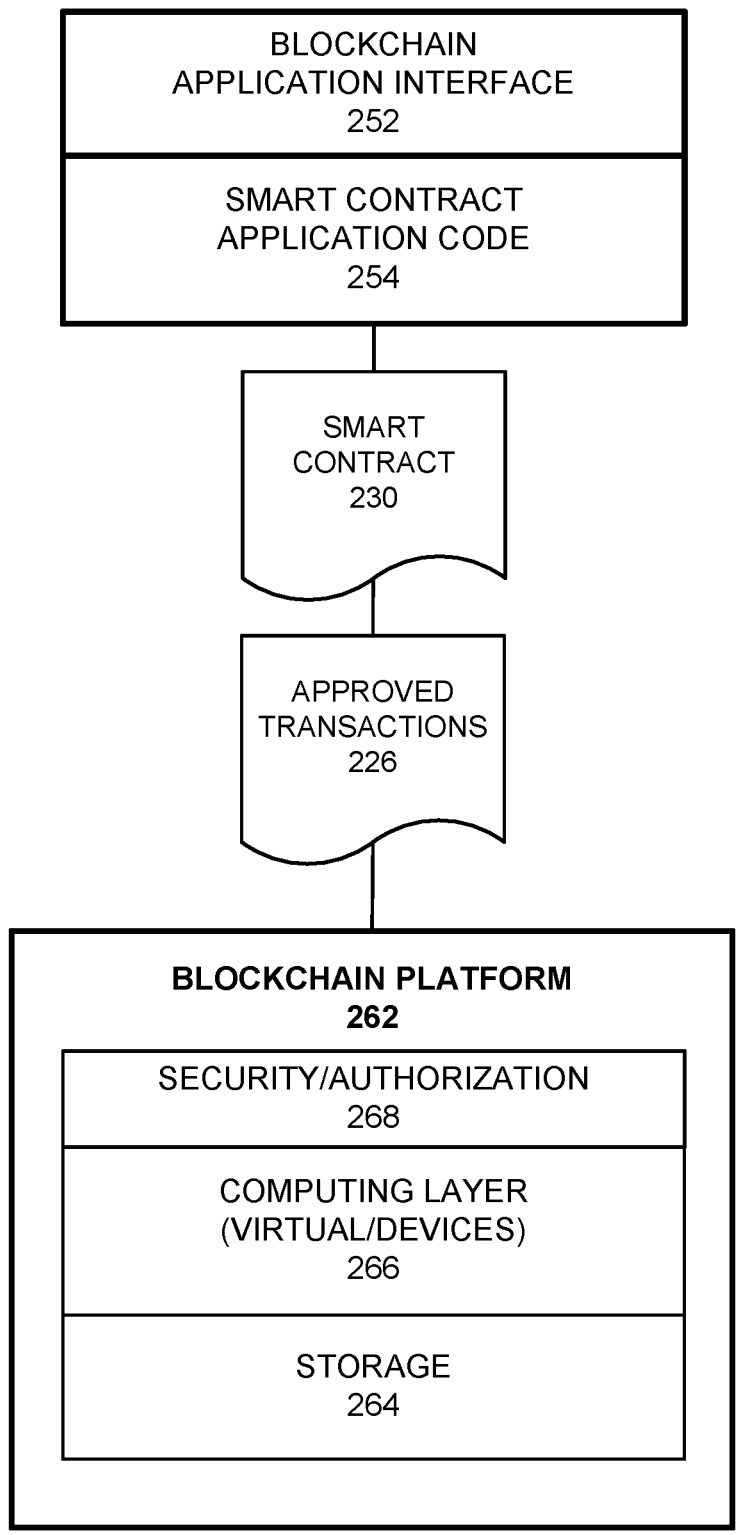
FIG. 2B illustrates a shared ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3A:
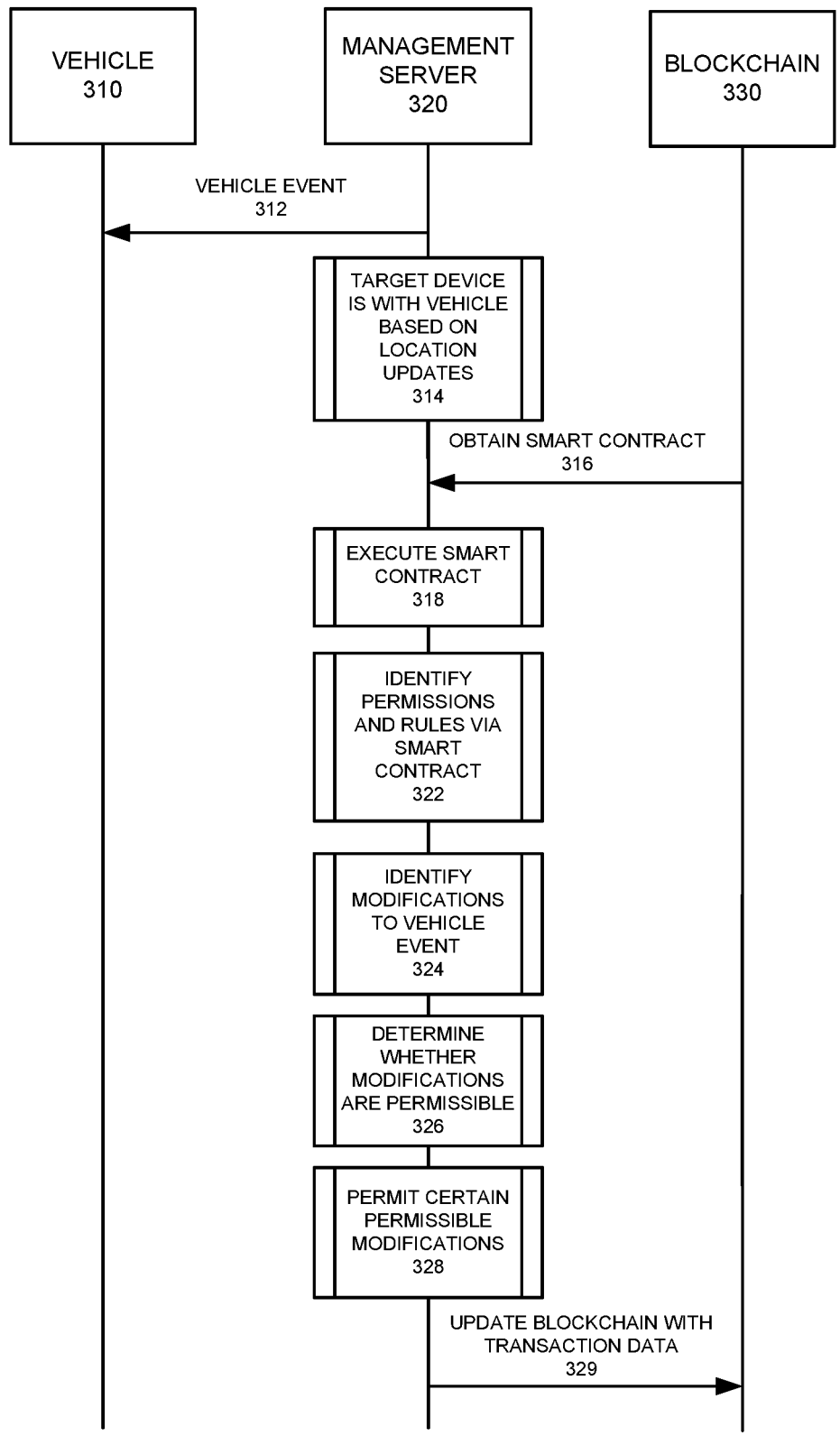
FIG. 3A illustrates a transport event configuration, according to example embodiments.

FIG. 3A illustrates a transport access system configuration, according to example embodiments. Referring to FIG. 3A, the system 300 provides a transport/vehicle 310, which may be requested via a user submitted request to initiate a vehicle event 312, which may be managed by a management server 320. The server 320 may identify a particular vehicle 310 being requested, such as one owned by a user, or one that is selected for purchase, rent, or is available for rental/taxi purposes. The user profile of the requesting entity may also be retrieved to apply to the vehicle 310 along with a set of defined vehicle features which are required/prohibited. The procedure for accessing and receiving a vehicle may be managed by a smart contract 316 associated with a blockchain. The smart contract may be executed 318 to enable a new vehicle event. The vehicle that is ideal for such an event may be identified as available, and target device may be identified and monitored via location updates 314. This process may load the user's profile on the vehicle and/or a customized vehicle event file that includes requirements retrieved from the user's profile and applied to a vehicle computer, via the smart contract 322, so the correct features are enabled/disabled by the central vehicle controller. During operation, such as once the target user has started moving with the vehicle, a request may originate from the target user or any of the trusted users to modify the current vehicle event data 324. For example, a stop at the grocery store on the way home may be requested, or the passenger may request to stop at a friend's house or other location. The target user could be a child or an elderly person or anyone that requires a guardian to monitor their well-being. The modification to the event may require permission from a trusted user and/or a reference to the rules or permissions which are stored in memory. If the modification is possible/permissible 326, then those permissible modifications may be permitted 328 and the event may be changed to include additional data in the server 320 and vehicle 310 to reflect those changes in route, etc. As the events are conducted, updates to the blockchain 330 may be performed 329 to store event data.

Figure 3B:
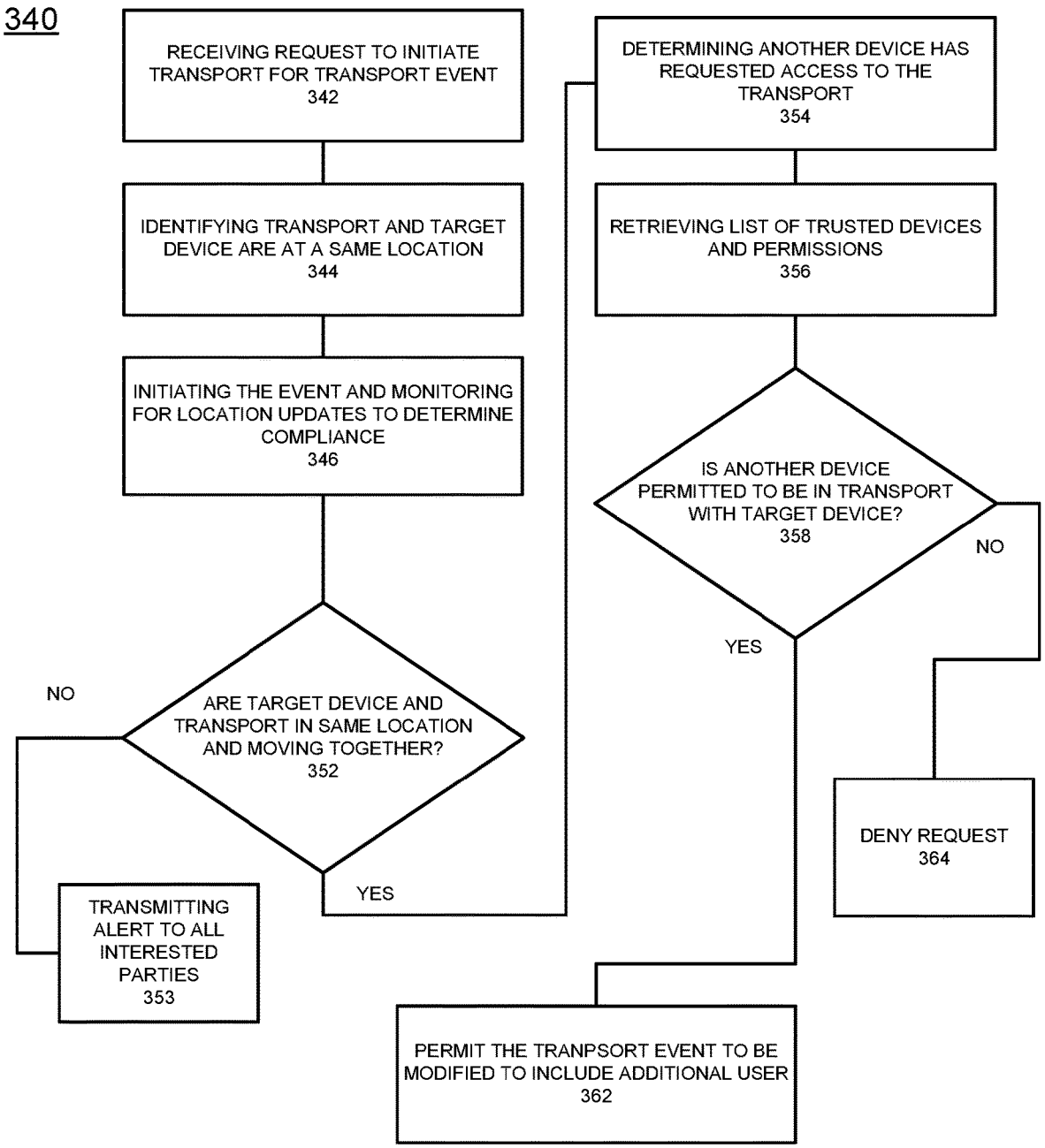
FIG. 3B illustrates a flow diagram of transport event monitoring, according to example embodiments.

FIG. 3B illustrates a user profile monitoring configuration, according to example embodiments. Referring to FIG. 3B, the flow diagram 340 includes a process to track a target user and apply specific event rules and permission to a vehicle event. The process may include receiving request 342 from a guardian or other overseeing party to engage a target user with a vehicle transport event. The transport selected must adhere to requirements, such as handicap features, child safety doors and seats, etc. The transport is then dispatched to head to the location of the target user which may be identified from a target user device carried by the target user. When the vehicle and user are at a same location 344 the event is initiated 346 based on the assumption the user is now in the vehicle. As the event progresses, the location of the vehicle and target user device are continuously monitored 346 for compliance, if the target user device and vehicle are not in the same location 352, then alerts may be sent to all interested parties 353. Otherwise, the process continues to determine whether other devices are requesting access to the same vehicle 354. This may be a prohibited action or at least most persons may be prohibited from entering the vehicle absent an exception list of registered user devices. The list may be stored in the server and retrieved 356 to identify the permissions and established information pertaining to the target user. If, during the decision process 358, the other user/user device is not permitted, the request is denied 364, the door will not open and the vehicle will not travel to that person's location based on their device. If they are permitted (e.g., parent, teacher, friend, etc.), and are known to the system, then they may be permitted to enter the vehicle 362.

Figure 3C:
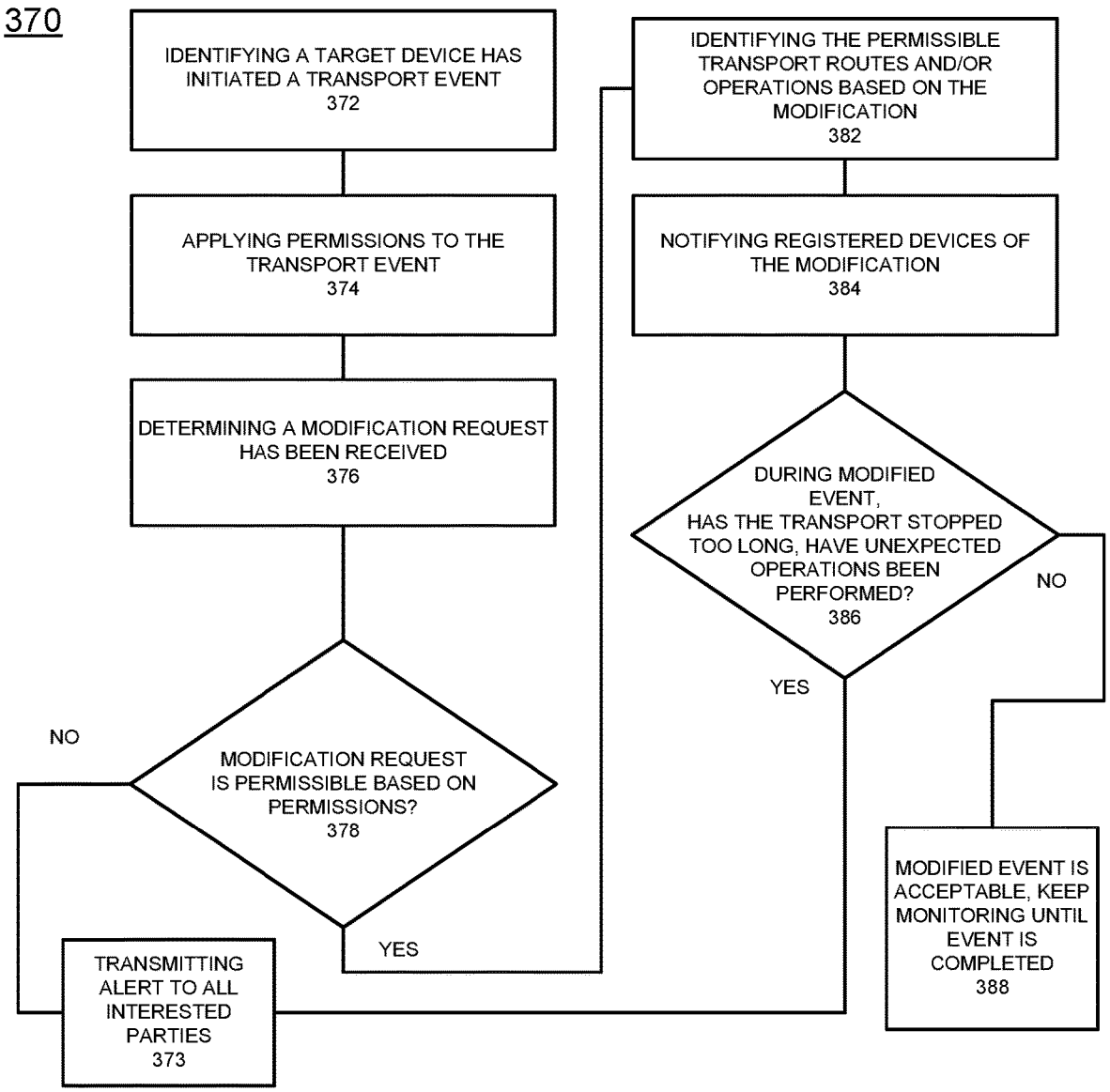
FIG. 3C illustrates another flow diagram of transport event monitoring, according to example embodiments.

FIG. 3C illustrates another flow diagram of transport event monitoring, according to example embodiments. Referring to FIG. 3C, the example method 370 provides an example of a target device receiving a transport event service and attempting to modify the event in route to a particular destination. In operation, the target device is identified 372, the permissions which may exist for that target device are then applied 374. The permissions which dictate what the target device is and is not permitted to do with regard to a transport event may be setup by a guardian party that has authority over that particular user's actions. For example, a minor may be able to call a vehicle service but may not be able to head towards a downtown area without explicitly documented permission. However, the target user may be able to make requests during the transport event and attempt to modify a vehicle event 376. For example, the target user may seek to visit a friend, go by the store, etc., on the way home. The modification may be in the form of a request that is received and processed to determine if the location requested is permitted based on permissions 378. If not, an alert is transmitted to all interested parties 373, which may override the automated decision by a trusted device party accepting the request. If the modification is acceptable, the permissible transport routes are identified, and the event is modified 382 to reflect the necessary changes to the route. The registered devices may be notified of the changes 384, such as a text message or in-application alert. Since the criteria has changed, additional monitoring and alerts may be required to monitor the vehicle's activities, such as did a door open when it should not have, did the trunk open to receive groceries, is the expected length of time (e.g., five minutes at the store, at a friend's house, etc.) of vehicle idle status exceeded or not, etc. The expected time periods, actions and other information are stored in a template file and measured against the actual data received to identify deviations 386. If the deviations are identified, an alert is sent, and if not, the modified event activities are deemed acceptable and process continues to monitor until completed 388. All identified events are logged in a blockchain transaction. The smart contract may have rules and the adherence or deviation from the rules may be logged for reference purposes.

Figure 4A:
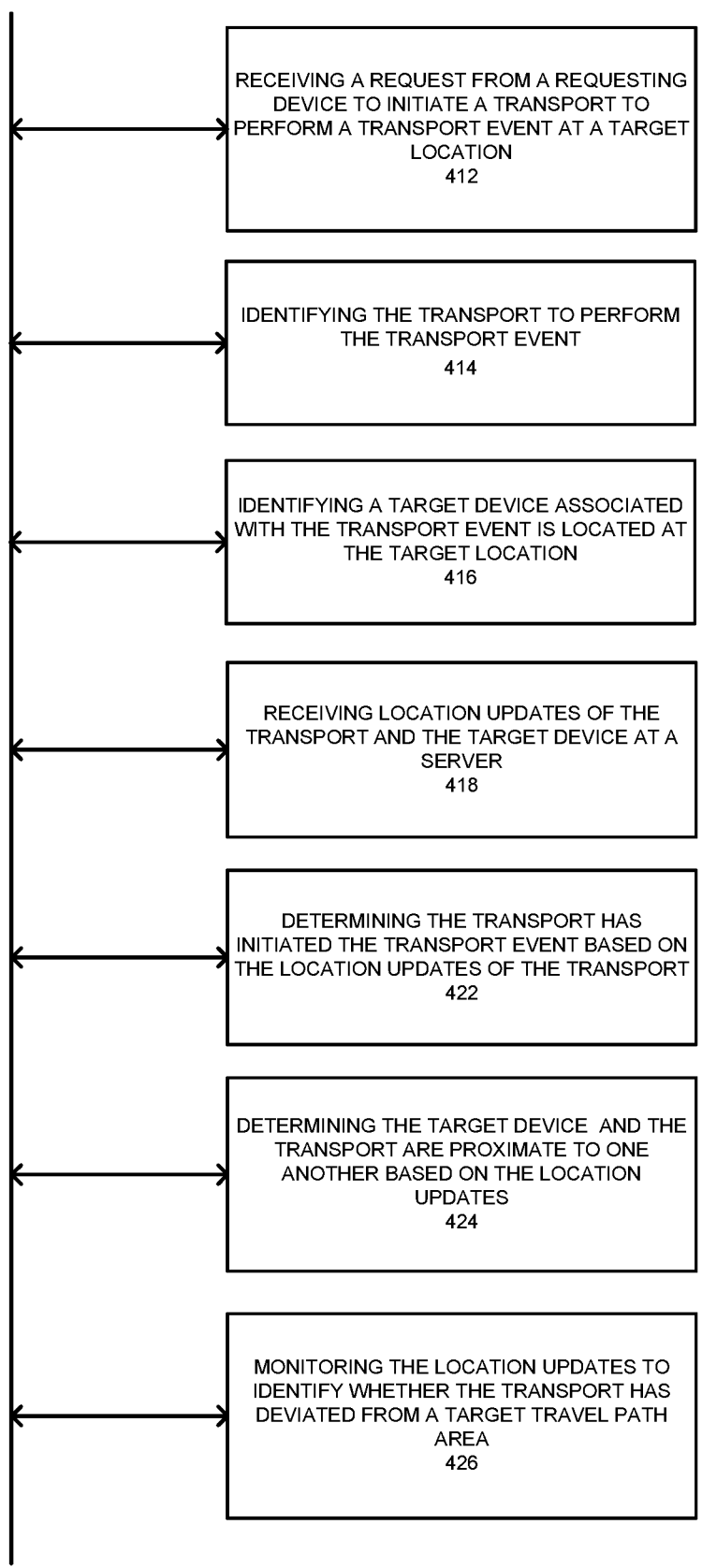
FIG. 4A illustrates a transport event setup and monitoring configuration flow diagram, according to example embodiments.

FIG. 4A illustrates a transport event setup and monitoring configuration flow diagram, according to example embodiments. Referring to FIG. 4A, the method 400 may include receiving a request from a requesting device to initiate a transport to perform a transport event at a target location 412, identifying the transport to perform the transport event 414, identifying a target device associated with the transport event is located at the target location 416, receiving location updates of the transport and the target device at a server 418, determining the transport has initiated the transport event based on the location updates of the transport 422, determining the target device and the transport are proximate to one another based on the location updates 424, and monitoring the location updates to identify whether the transport has deviated from a target travel path area 426.

The method may also include determining another device has requested access to the transport, responsive to receiving the another device request, retrieving a list of trusted devices, determining whether the another device is permitted to access the transport during the transport event based on the list of trusted devices, when the another device is included in the list of trusted devices, modifying the transport event to stop at the another device's location, and notifying the requesting device of the another device and the modified transport event. When another device is not included in the list of trusted devices, denying the request to access the transport. The method may also include determining the target device and the transport are not proximate to one another based on the location updates, determining whether the target device is located at a target destination, and transmitting a confirmation message to the requesting entity to confirm the transport event has completed. The method may also include determining a location of the target device has deviated from the target travel path area, transmitting a notification to the requesting device indicating the deviation, transmitting an instruction to the transport to correct the deviation, and receiving a confirmation that the transport has corrected the deviation.

The method may also include retrieving a smart contract from a distributed ledger, invoking the smart contract responsive to receiving the request for the transport event, and determining, from the smart contract, the target device requires a specific category of transport and is permitted to be transported to one or more identified destination locations. The method may also include creating a blockchain transaction with a date of the transport event, a time of the transport event, the target location, a target destination and transport identification information, and storing the blockchain transaction in the distributed ledger.

Figure 4B:
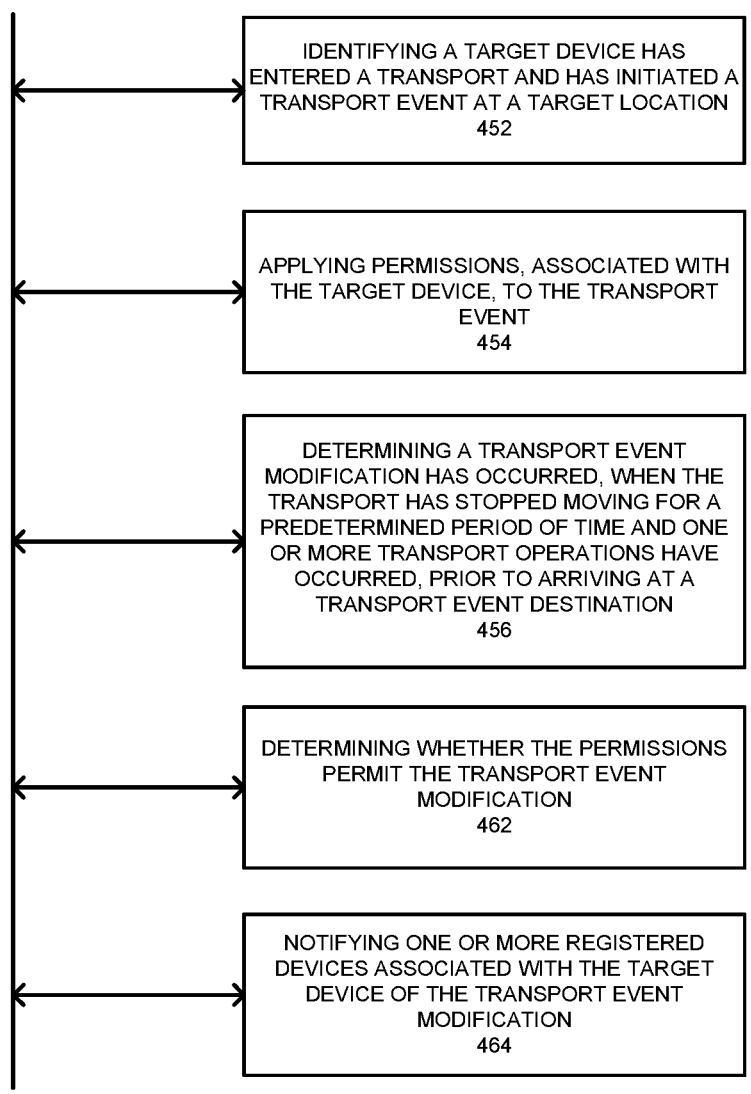
FIG. 4B illustrates another transport event setup and monitoring configuration, according to example embodiments.

FIG. 4B illustrates another transport event setup and monitoring configuration, according to example embodiments. Referring to FIG. 4B, the method 450 includes identifying a target device has entered a transport and has initiated a transport event at a target location 452, applying permissions, associated with the target device, to the transport event 454, determining a transport event modification has occurred, when the transport has stopped moving for a predetermined period of time and one or more transport operations have occurred, prior to arriving at a transport event destination 456, determining whether the permissions permit the transport event modification 462 and notifying one or more registered devices associated with the target device of the transport event modification 464.

The method may also include receiving a request to perform the transport event modification during the transport event, determining whether the request originated from one or more of the registered devices, and responsive to determining the request originated from one or more of the registered devices, permitting the transport event modification, and responsive to permitting the transport event modification, adding another destination location to the transport event as a next destination for the transport, and determining an estimated amount of transport stop time and one or more of the transport operations which are expected to occur during the transport stop time. The method may also include identifying the transport has arrived at the next destination, determining whether an amount of transport stop time has exceeded the estimated amount of transport stop time, determining whether the one or more expected transport operations have occurred during the transport stop time, and notifying one or more of the registered devices when at least one of the amount of transport stop time has exceeded the estimated amount of transport stop time and at least one prohibited transport operation has occurred during the transport stop time. The method may also include receiving a request to perform the transport event modification during the transport event, determining the request originated from the target device, determining the request comprises a modified destination, retrieving a user device profile associated with a user device associated with the modified destination, transmitting a request for confirmation of the transport event modification to the user device associated with the modified destination, transmitting a request for permission to the one or more registered devices, and responsive to receiving a confirmation from the user device associated with the modified destination and a permission response from the one or more registered devices, permitting the transport event modification. The method may also include retrieving a smart contract from a distributed ledger, invoking the smart contract responsive to identifying the transport event, and determining, from the smart contract, the target device requires a specific category of transport and is permitted to be transported to one or more identified destination locations. The method may also provide creating a blockchain transaction comprising a date of the transport event, a time of the transport event, the target location, a transport event destination and transport identification information, and storing the blockchain transaction in the distributed ledger.

Figure 4C:
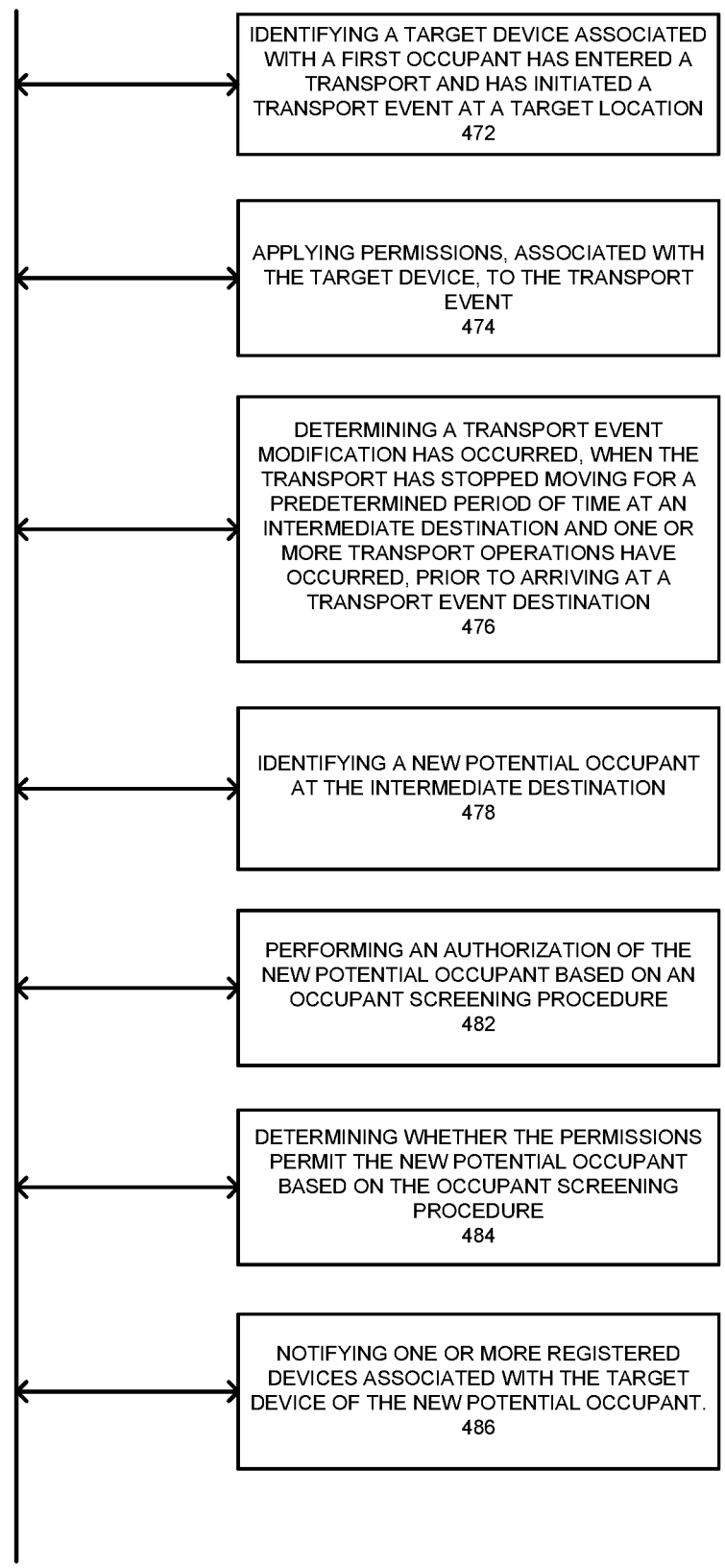
FIG. 4C illustrates yet another transport event setup and monitoring configuration, according to example embodiments.

FIG. 4C illustrates yet another transport event setup and monitoring configuration, according to example embodiments. The method 470 may include identifying a target device associated with a first occupant has entered a transport and has initiated a transport event at a target location 472, applying permissions, associated with the target device, to the transport event 474, determining a transport event modification has occurred, when the transport has stopped moving for a predetermined period of time at an intermediate destination and one or more transport operations have occurred, prior to arriving at a transport event destination 476, identifying a new potential occupant at the intermediate destination 478, performing an authorization of the new potential occupant based on an occupant screening procedure 482, determining whether the permissions permit the new potential occupant based on the occupant screening procedure 484, and notifying one or more registered devices associated with the target device of the new potential occupant 486.

In this example, the new potential occupant may be authorized by a biometric data input requirement, such as a facial scan, a retina scan, a fingerprint, a voice sample, etc. The potential occupant may provide such information to his or her device, a scanner on the vehicle, etc. The user may be identified, and the vehicle may open to permit access of the new user occupant, or, the user may not receive access depending on the permissions of the transport event.

Figure 5A:
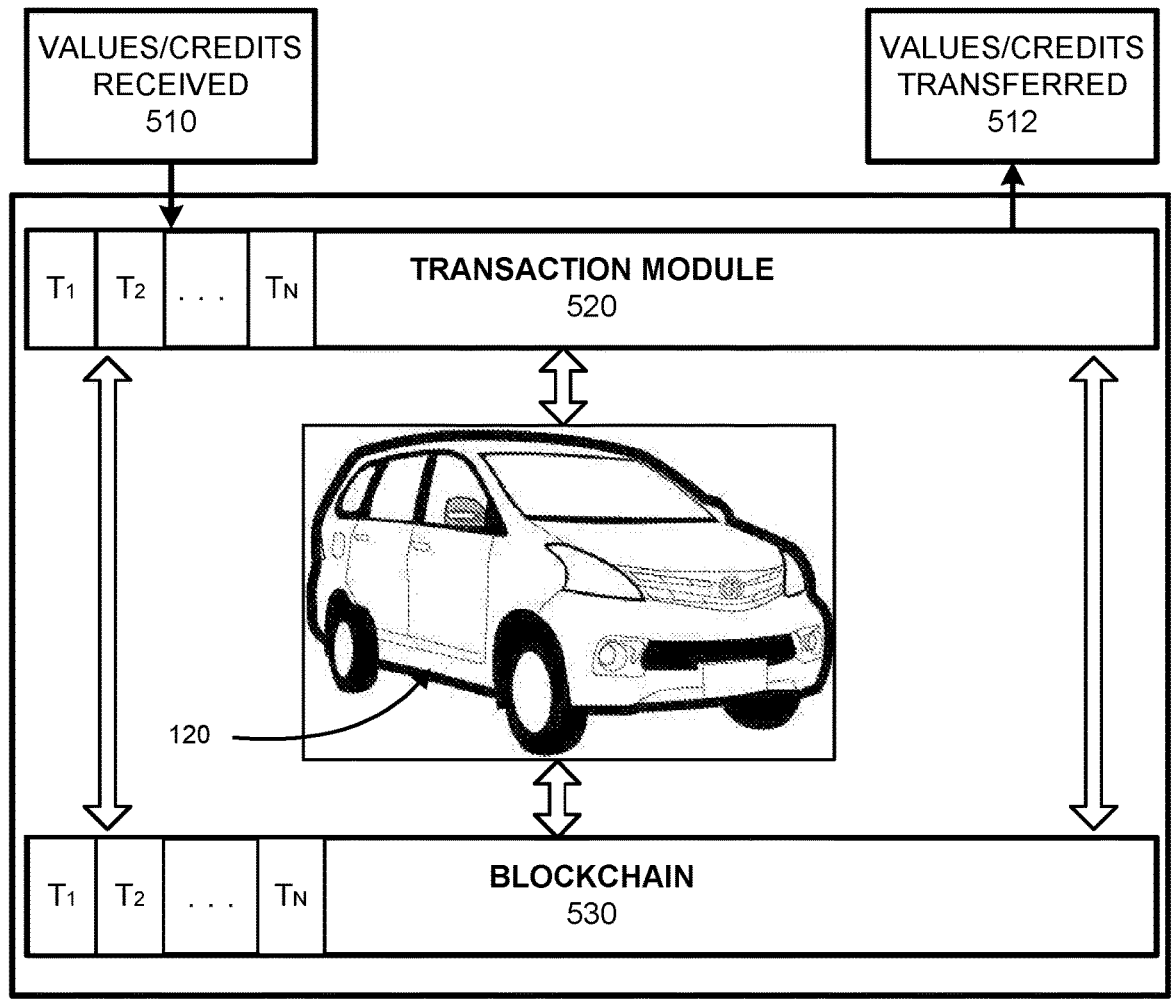
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. Responsibility for value/credits received and/or transferred can be determined by the system, the requesting device, or the transport as described herein.

Figure 5B:
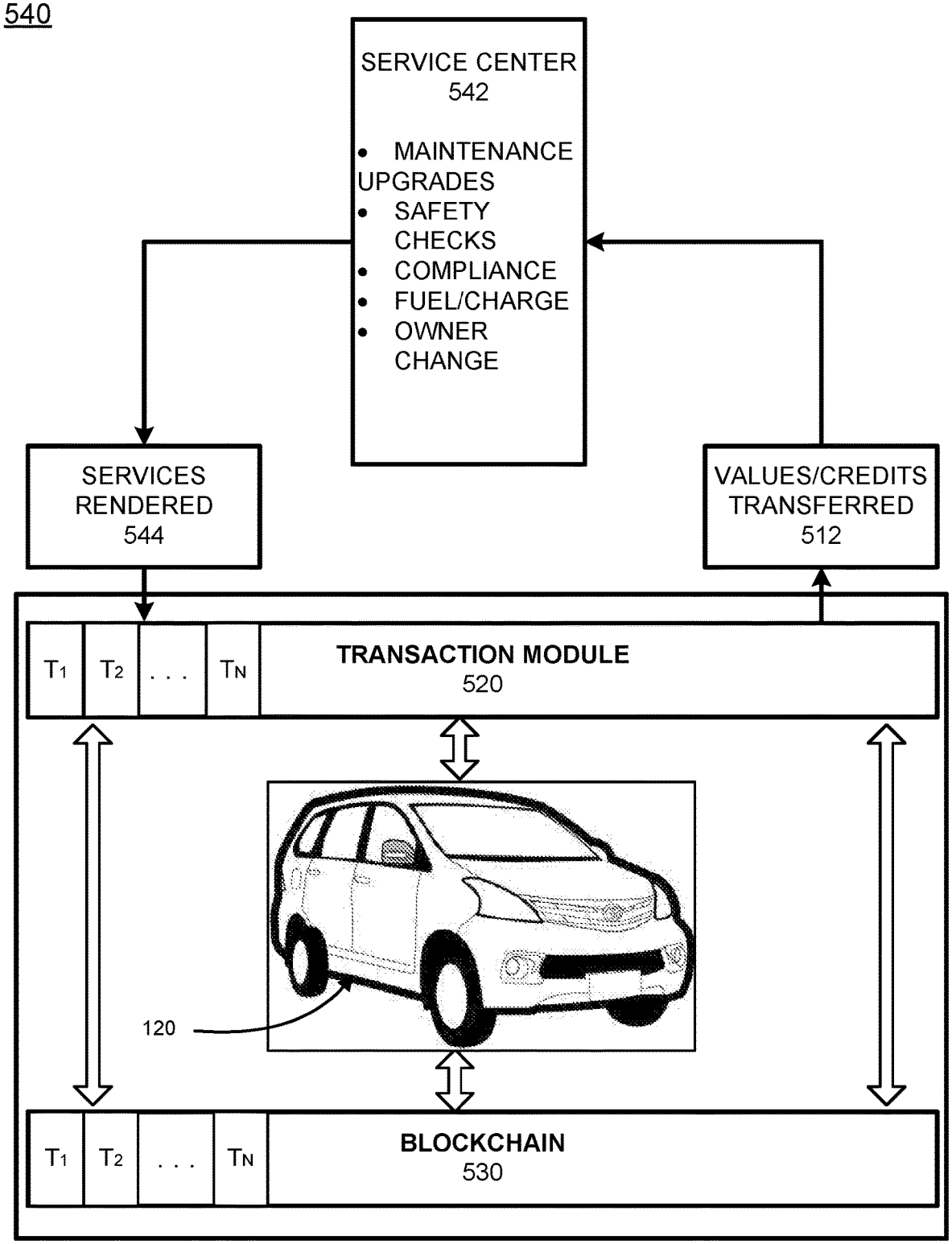
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the occupants may then be responsible for the responsibility value increase for such a service. Adherence to a regular service schedule may be part of the adherence rate or compliance necessary to achieve an optimal user vehicle status. A service stop may/may not be a permissible action permitted by a vehicle event associated with a particular occupant/target user, depending on their permissions.

Figure 5C:
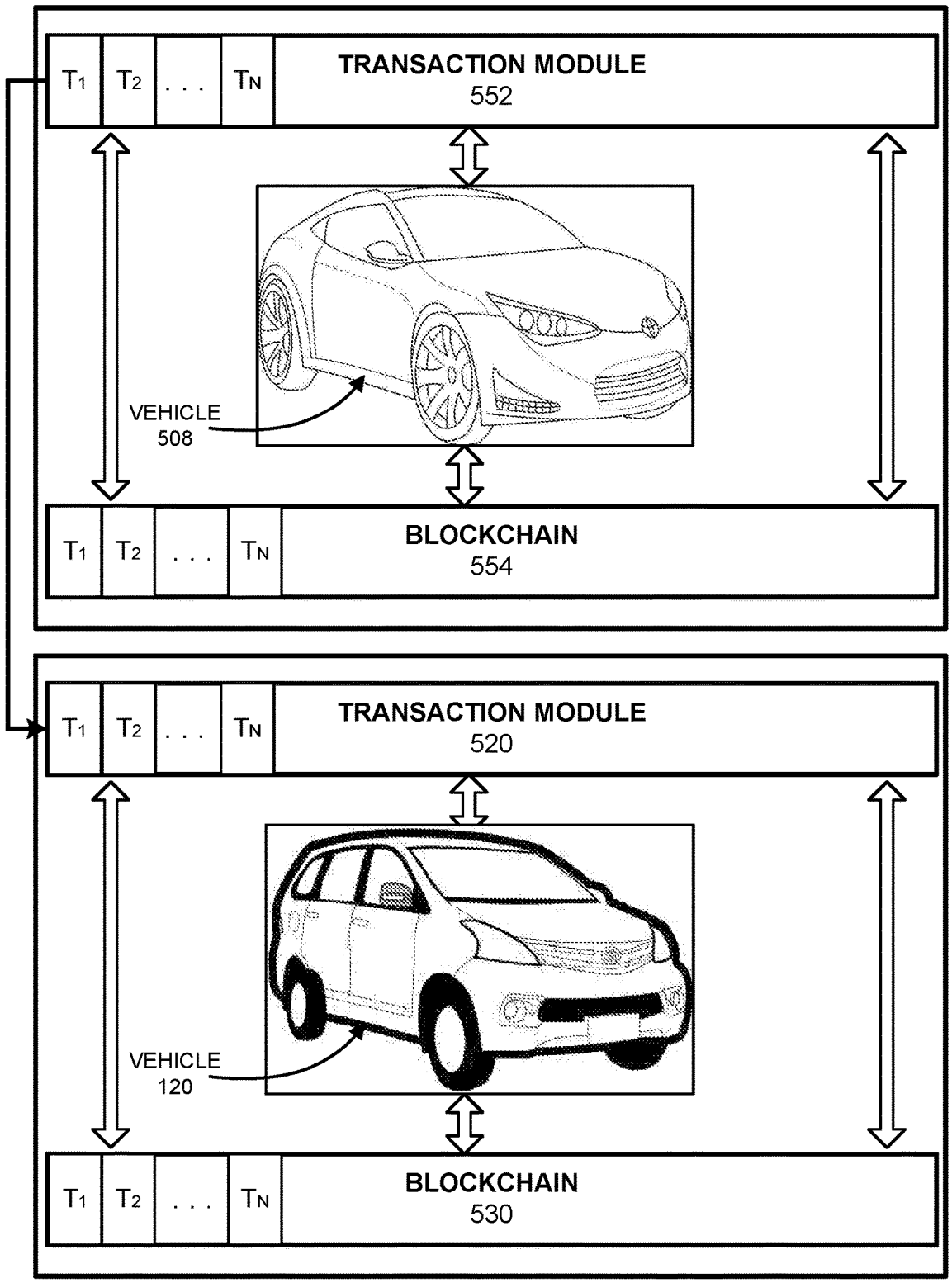
FIG. 5C illustrates a further example blockchain transport configuration, according to example embodiments.

FIG. 5C illustrates an example blockchain vehicle configuration 550 for managing blockchain transactions conducted among various vehicles, according to example embodiments. The vehicle 120 may engage with another vehicle 508 to perform various actions, such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/554 assuming that the blockchains are different from one another, or, are logged in the same blockchain used by all members.

Figure 6:
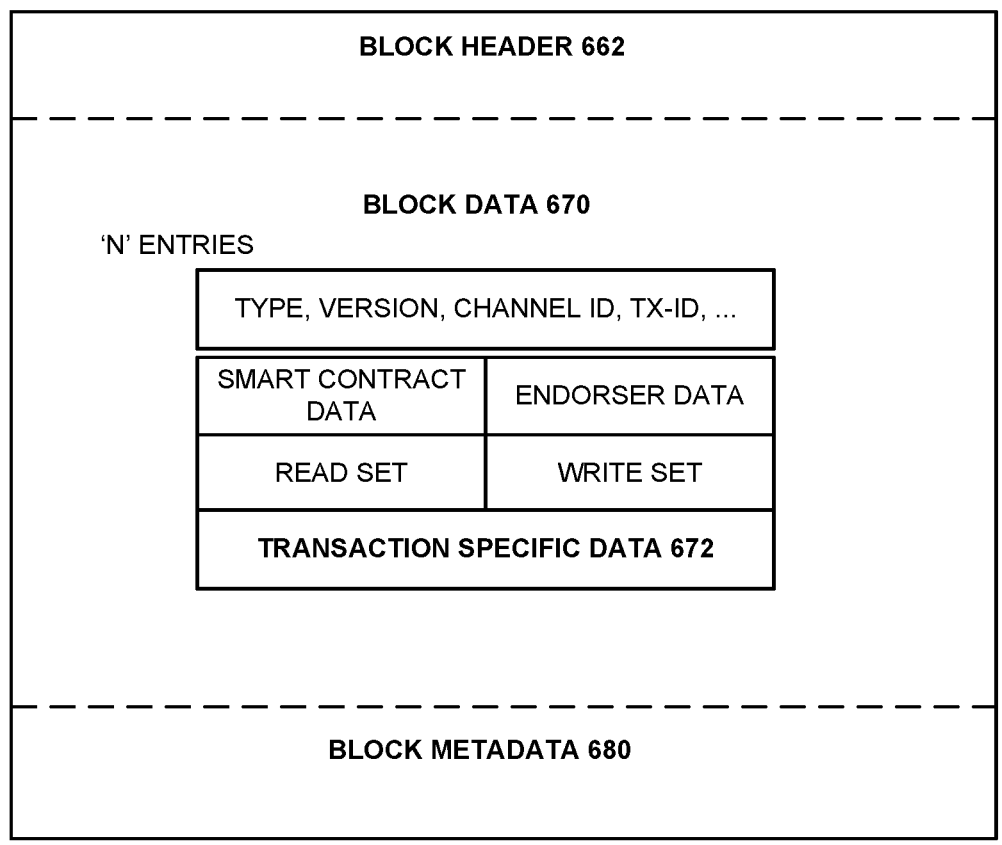
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
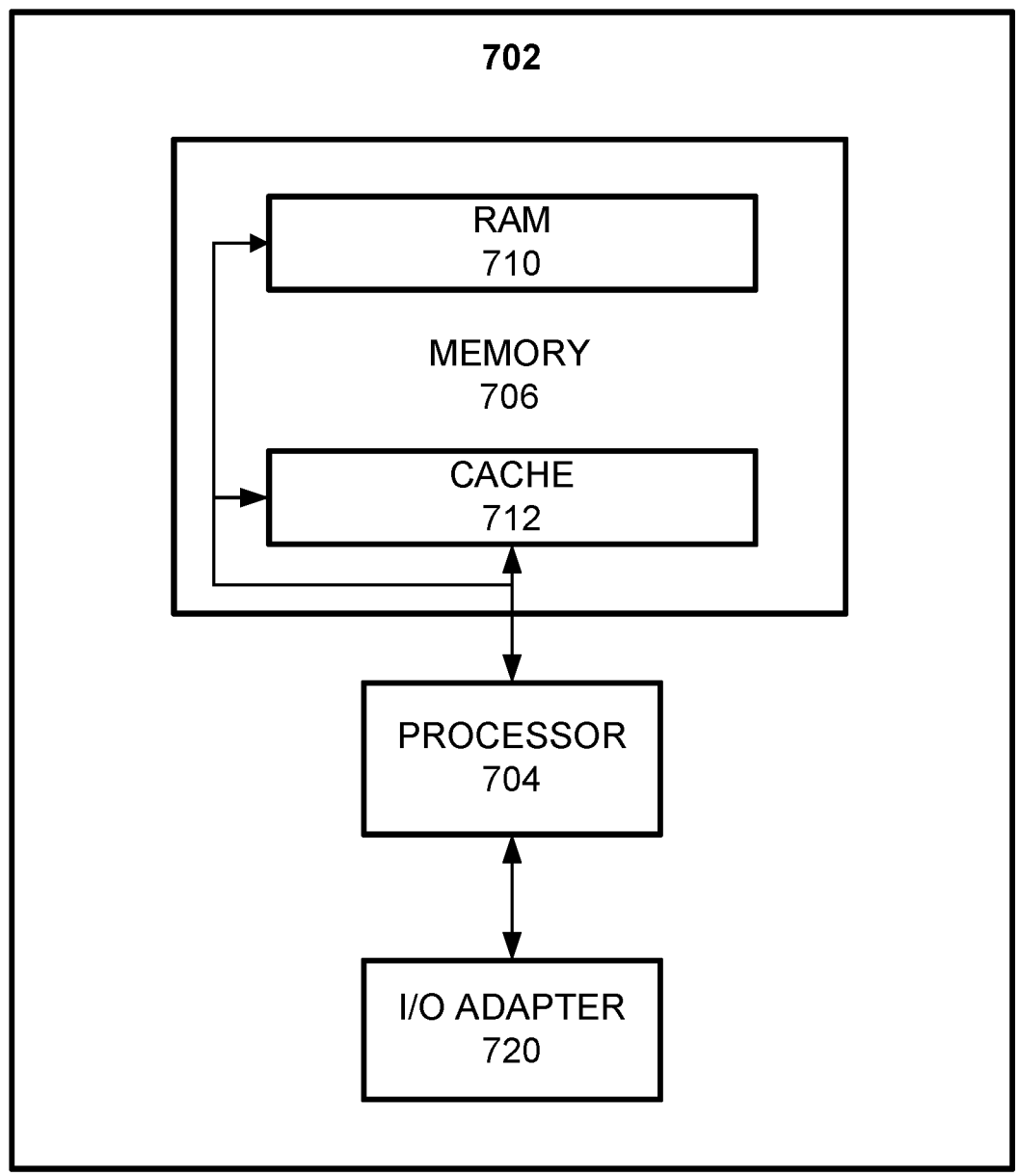
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth herein.

In computing node 700 there is a computer system/server 702, which is operational with numerous other general purposes or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O adapter 720, such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces via adapter 720. Still yet, computer system/server 702 can communicate with one or more networks such as a local area network (LAN), a general wide area network (WAN), and/or a public network (e.g., the Internet) via a network adapter. The network adapter communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    determining, via a server, a transport has initiated a transport event based on location updates of the transport received by the server and location updates of a target device located inside the transport;
    determining, via the server, the transport event has been modified based on a request received from one or more trusted devices at a remote location from the transports, wherein the request comprises a pickup location to pickup goods via a trunk of the transport;
    determining, via the server, the transport event has been further modified based on a request received from the target device to visit a non-permitted location;
    receiving, via the server, permission from the one or more trusted devices to permit the non-permitted location;
    enabling a modified transport event to proceed to include the transport visiting the pickup location and the permitted non-permitted location, wherein vehicle doors of the transport are prevented from opening throughout the pickup location and the trunk is permitted to be opened at the pickup location; and
    monitoring a location of the target device and the transport during the modified transport event.

2. The method of claim 1, further comprising:
    determining another device has requested access to the transport;
    responsive to receiving the another device request, retrieving a list of the trusted devices;
    determining whether the another device is permitted to access the transport during the transport event based on the list of trusted devices;

when the another device is included in the list of trusted devices, modifying the transport event to stop at the another device's location.

3. The method of claim 1, further comprising:
determining another device has requested access to the transport;
responsive to receiving the another device request, retrieving a list of the trusted devices;
determining whether the another device is permitted to access the transport during the transport event based on the list of trusted devices; and
when the another device is not included in the list of trusted devices, denying the request to access the transport.

4. The method of claim 1, further comprising:
determining the target device and the transport are not proximate to one another based on the location updates;
determining whether the target device is located at a final destination associated with the transport event; and
transmitting a confirmation message to the requesting entity to confirm the transport event has completed.

5. The method of claim 1, further comprising:
determining a location of the target device has deviated from a target travel path area;
transmitting a notification indicating the deviation;
transmitting an instruction to the transport to correct the deviation; and
receiving a confirmation that the transport has corrected the deviation.

6. The method of claim 1, further comprising:
retrieving a smart contract from a distributed ledger;
invoking the smart contract responsive to receiving the request for the transport event; and
determining, from the smart contract, the target device requires a specific category of transport and is permitted to be transported to one or more identified destination locations.

7. The method of claim 6, further comprising:
creating a blockchain transaction comprising a date of the transport event, a time of the transport event, the target location, a target destination and transport identification information; and
storing the blockchain transaction in the distributed ledger.

8. A system, comprising:
a server configured to:
determine a transport has initiated a transport event based on locations updates of the transport received by the server and location updates of a target device located inside the transport;
determine the transport event has been modified based on a request received from one or more trusted devices at a remote location from the transport, wherein the request comprises a pickup location to pickup goods via a trunk of the transport;
determine the transport event has been further modified based on a request received from the target device to visit a non-permitted location;
receive permission from the one or more trusted devices to permit the non-permitted location;
enable a modified transport event to proceed to include the transport visiting the pickup location and the permitted non-permitted location, wherein vehicle doors of the transport are prevented from opening throughout the pickup location and the trunk is permitted to be opened at the pickup location; and
monitor a location of the target device and the transport during the modified transport event.

9. The system of claim 8, the server configured to:
determine another device has requested access to the transport;
responsive to the reception of the another device request, retrieve a list of the trusted devices;
determine whether the another device is permitted to access the transport during the transport event based on the list of trusted devices; and
when the another device is included in the list of trusted devices, modify the transport event to stop at the another device's location.

10. The system of claim 8, the server configured to:
determine another device has requested access to the transport;
responsive to the reception of the another device request, retrieve a list of the trusted devices;
determine whether the another device is permitted to access the transport during the transport event based on the list of trusted devices; and
when the another device is not included in the list of trusted devices, deny the request to access the transport.

11. The system of claim 8, the server configured to:
determine the target device and the transport are not proximate to one another based on the location updates;
determine whether the target device is located at a final destination associated with the transport event; and
transmit a confirmation message to confirm the transport event has completed.

12. The system of claim 8, the server configured to:
determine a location of the target device has deviated from a target travel path area;
transmit a notification to indicate the deviation;
transmit an instruction to the transport to correct the deviation; and
receive a confirmation that the transport has corrected the deviation.

13. The system of claim 8, the server configured to:
retrieve a smart contract from a distributed ledger;
invoke the smart contract responsive to the reception of the request for the transport event; and
determine, from the smart contract, the target device requires a specific category of transport and is permitted to be transported to one or more identified destination locations.

14. The system of claim 13, the server configured to:
create a blockchain transaction comprising a date of the transport event, a time of the transport event, the target location, a target destination and transport identification information; and
store the blockchain transaction in the distributed ledger.

15. A non-transitory computer readable medium comprising instructions, that when read by a processor, cause the processor to perform:
determining, via a server, a transport has initiated a transport event based on location updates of the transport received by the server and location updates of a target device located inside the transport;
determining, via the server, the transport event has been modified based on a request received from one or more trusted devices at a remote location from the transport, wherein the request comprises a pickup location to pickup goods via a trunk of the transport;
determining, via the server, the transport event has been further modified based on a request received from the target device to visit a non-permitted location;

receiving, via the server, permission from the one or more trusted devices to permit the non-permitted location;

enabling a modified transport event to proceed to include the transport visiting the pickup location and the permitted non-permitted location, wherein vehicle doors of the transport are prevented from opening throughout the pickup location and the trunk is permitted to be opened at the pickup location; and monitoring a location of the target device and the transport during the modified transport event.

16. The non-transitory computer readable medium of claim 15, further comprising:

determining another device has requested access to the transport;

responsive to receiving the another device request, retrieving a list of the trusted devices;

determining whether the another device is permitted to access the transport during the transport event based on the list of trusted devices;

when the another device is included in the list of trusted devices, modifying the transport event to stop at the another device's location.

17. The non-transitory computer readable medium of claim 15, further comprising:

determining another device has requested access to the transport;

responsive to receiving the another device request, retrieving a list of the trusted devices;

determining whether the another device is permitted to access the transport during the transport event based on the list of trusted devices; and when the another device is not included in the list of trusted devices, denying the request to access the transport.

18. The non-transitory computer readable medium of claim 15, further comprising:

determining the target device and the transport are not proximate to one another based on the location updates;

determining whether the target device is located at a final destination associated with the transport event; and transmitting a confirmation message to confirm the transport event has completed.

19. The non-transitory computer readable medium of claim 15, further comprising:

determining a location of the target device has deviated from a target travel path area;

transmitting a notification indicating the deviation;

transmitting an instruction to the transport to correct the deviation; and receiving a confirmation that the transport has corrected the deviation.

20. The non-transitory computer readable medium of claim 15, further comprising:

retrieving a smart contract from a distributed ledger;

invoking the smart contract responsive to receiving the request for the transport event; and determining, from the smart contract, the target device requires a specific category of transport and is permitted to be transported to one or more identified destination locations.

* * * * *